United States Patent
Schönherr et al.

(10) Patent No.: US 12,005,585 B2
(45) Date of Patent: Jun. 11, 2024

(54) OFFLINE ROBOT PLANNING WITH ONLINE ADAPTATION

(71) Applicant: Intrinsic Innovation LLC, Mountain View, CA (US)

(72) Inventors: Ralf Oliver Michael Schönherr, San Francisco, CA (US); Tim Niemueller, Gauting (DE); Andre Gaschler, Munich (DE)

(73) Assignee: Intrinsic Innovation LLC, Mountain View, CA (US)

(*) Notice: Subject to any disclaimer, the term of this patent is extended or adjusted under 35 U.S.C. 154(b) by 214 days.

(21) Appl. No.: 16/728,660

(22) Filed: Dec. 27, 2019

(65) Prior Publication Data

US 2021/0197378 A1 Jul. 1, 2021

(51) Int. Cl.
*B25J 9/16* (2006.01)

(52) U.S. Cl.
CPC .................... *B25J 9/1666* (2013.01)

(58) Field of Classification Search
CPC ...... B25J 9/1666; B25J 9/1664; B25J 9/1691; B25J 9/1633; B25J 9/16; B25J 9/1602; B25J 9/1612; B25J 13/085; B25J 13/089; B25J 13/087; G05B 2219/40507
See application file for complete search history.

(56) References Cited

U.S. PATENT DOCUMENTS

| | | | |
|---|---|---|---|
| 5,412,759 A * | 5/1995 | Yano | G05B 19/4083 700/248 |
| 9,149,931 B2 | 10/2015 | Kamiya | |
| 9,382,643 B2 | 7/2016 | Moore et al. | |
| 10,353,399 B2 * | 7/2019 | Ebrahimi Afrouzi | G05D 1/0219 |
| 10,668,623 B2 * | 6/2020 | Zhang | B25J 9/1679 |
| 2008/0058990 A1 | 3/2008 | Sassatelli et al. | |
| 2017/0190053 A1 * | 7/2017 | Xu | B25J 9/1664 |
| 2018/0089563 A1 * | 3/2018 | Redding | G06N 3/006 |
| 2019/0129444 A1 * | 5/2019 | Wirth | G05D 1/0274 |
| 2019/0228495 A1 * | 7/2019 | Tremblay | G05B 13/00 |
| 2019/0391597 A1 * | 12/2019 | Dupuis | B25J 9/0084 |
| 2021/0191404 A1 * | 6/2021 | Blake | G05D 1/0238 |

FOREIGN PATENT DOCUMENTS

| KR | 20090113746 A | * 11/2009 |
|---|---|---|
| KR | 20090113746 A | * 11/2009 |

* cited by examiner

*Primary Examiner* — Khoi H Tran
*Assistant Examiner* — Nhi Q Bui
(74) *Attorney, Agent, or Firm* — Fish & Richardson P.C.

(57) ABSTRACT

Methods, systems, and apparatus, including computer programs encoded on computer storage media, for performing online robotic motion planning from pre-generated motion plans. A library of pre-generated motion plans for performing a particular task is maintained. Each pre-generated motion plan comprises a plurality of waypoints and one or more actions. One or more present observations of a robot in a workcell are obtained. The one or more observations are classified. A pre-generated candidate motion plan that matches the labels assigned to the present observations of the robot in the workcell is selected from the library of pre-generated motion plans. The pre-generated candidate motion plan is adapted according to the present observations of the robot in the workcell to generate a final motion plan to be executed by the robot.

17 Claims, 6 Drawing Sheets

| | |
|---|---|
| ○—▷—○ 430 | Candidate motion plan |
| ○----▷----○ | Candidate motion plan – option 1 |
| ○----▷----○ | Candidate motion plan – option2 |
| ●—▶—● 420 | Final motion plan |

OFFLINE ROBOT PLANNING WITH ONLINE ADAPTATION

BACKGROUND

This specification relates to robotics, and more particularly to planning robotic movements.

In robotics, motion planning refers to scheduling the physical movements of robots in order to perform tasks. For example, an industrial robot that builds cars can be programmed to first pick up a car part and then weld the car part onto the frame of the car. Each of these actions can themselves include dozens or hundreds of individual movements by robot motors and actuators.

Motion planning is very expensive in terms of computation. The online implementation of motion planning thus introduces a lag that makes it difficult for the robot to react to real-time changes in the environment.

SUMMARY

This specification describes how a system can schedule the physical movements of a robot during the movement of the robot, so that the movement of the robot can adapt to real time changes in the environment.

Particular embodiments of the subject matter described in this specification can be implemented so as to realize one or more of the following advantages.

Selecting a pre-generated candidate motion plan and adapting the pre-generated candidate motion plan to the present observations of the robot is more efficient in terms of computation time than computing a motion plan from scratch based on the present observations of the robot. As such, some embodiments improve the reactivity of the robot to real-time changes in the environment. This allows the deployment of robots in dynamic environments.

Some embodiments guarantee the compatibility of the motion plan with other moving robots nearby. The pre-generated candidate motion plans can be computed to guarantee that the robot will stay within a certain footprint or to verify other compatibility constraints with other moving pieces in the workcell. This can help avoid collision with other robots, which may already have started moving before the selected pre-generated candidate motion plan is adapted. Because the pre-generated candidate motion plans verifies the compatibility constraints, the final motion plan is very likely to verify the same constraints. Ensuring that such compatibility constraints are verified when computing a motion plan from scratch would involve a long, inefficient search algorithm.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
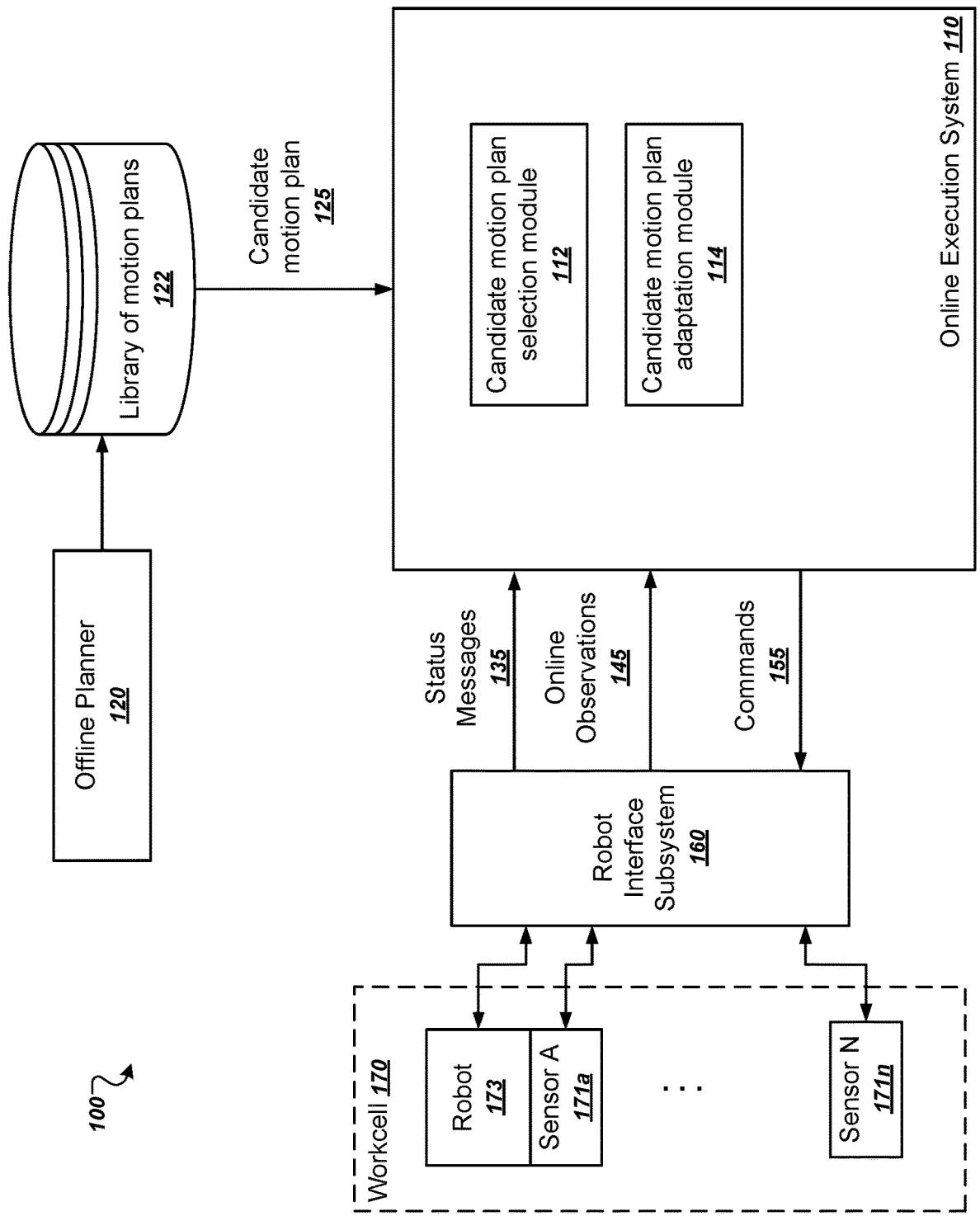
FIG. 1 is a diagram that illustrates an example system.

FIG. 1 is a diagram that illustrates an example system 100. The system 100 is an example of a system that can implement the online robotic control techniques described in this specification.

The system 100 includes a number of functional components, including an online execution system 110 and a robot interface subsystem 160. Each of these components can be implemented as computer programs installed on one or more computers in one or more locations that are coupled to each other through any appropriate communications network, e.g., an intranet or the Internet, or combination of networks.

In general, the online execution system 110 provides commands 155 to be executed by the robot interface subsystem 160, which drives a robot, e.g., robot 173, in a workcell 170. A workcell is the physical environment in which a robot will operate. Workcells have particular physical properties, e.g., physical dimensions that impose constraints on how robots can move within the workcell.

In order to compute the commands 155, the online execution system 110 consumes status messages 135 generated by the robot 173 and online observations 145 made by one or more sensors 171a-n making observations within the workcell 170. A robot can have multiple sensors, and the sensors can be mounted on stationary or movable surfaces in the workcell 170.

The online execution system 110 issues commands 155 to the robot interface system 160 in order to actually drive the movements of the moveable components, e.g., the joints, of the robot 173. In some implementations, the robot interface subsystem 160 provides a hardware-agnostic interface so that the commands 155 issued by online execution system 110 are compatible with multiple different versions of robots. During execution the robot interface subsystem 160 can report status messages 135 back to the online execution system 110 so that the online execution system 110 can make online adjustments to the robot movements, e.g., due to local faults or other unanticipated conditions.

The robot interface subsystem 160 and the online execution system 110 can operate according to different timing constraints. In some implementations, the robot interface subsystem 160 is a real-time software control system with hard real-time requirements. Real-time software control systems are software systems that are required to execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation.

The online execution system 110, on the other hand, typically has more flexibility in operation. In other words, the online execution system 110 may, but need not, provide a command 155 within every real-time time window under which the robot interface subsystem 160 operates. However, in order to provide the ability to make sensor-based reactions, the online execution system 110 may still operate under strict timing requirements. In a typical system, the real-time requirements of the robot interface subsystem 160 require that the robots provide a command periodically, such as every 5 milliseconds, while the online requirements of the online execution system 110 specify that the online execution system 110 should provide a command 155 to the robot interface subsystem 160 at a lower frequency, such as every 20 milliseconds or every second. However, even if such a command is not received within the online time window, the robot interface subsystem 160 need not necessarily enter a fault state.

Thus, in this specification, the term online refers to both the time and rigidity parameters for operation. The time windows are larger than those for the real-time robot interface subsystem 160, and there is typically more flexibility when the timing constraints are not met.

The system 100 also includes an offline planner 120. The offline planner 120 computes candidate motion plans for performing a task under a plurality of different nominal conditions. The offline planner 120 stores the candidate motion plans in a library of motion plans 122.

The offline planning process is typically computationally expensive. Thus, in some implementations, the offline planner 120 is implemented by a cloud-based computing system comprising many, possibly thousands, of computers. The offline planner 120 is thus commonly physically remote from a facility that houses the workcell 170. On the other hand, the online execute engine 110 is typically local to the facility that houses the workcell 170.

This arrangement thus provides three different computing zones. The offline planner 120 can use massive cloud-based computing resources to consider many possibilities for generating the candidate motion plans. The online execution system 110 allows for online reaction to unanticipated events. The robot interface subsystem 160 provides precision and real-time safety mechanisms.

In execution, the robot 173 generally continually executes the commands specified explicitly or implicitly by motion plans to perform the various tasks or transitions of the motion plan. The robot can be a real-time robot, which means that the robot is programmed to continually execute its commands according to a highly constrained timeline. For example, the robot can expect a command from the robot interface subsystem 160 at a particular frequency, e.g., 100 Hz or 1 kHz. If the robot does not receive a command that is expected, the robot can enter a fault mode and stop operating.

The online execution system 110 includes a candidate motion plan selection module 112 and a candidate motion plan adaptation module 114. In execution, the candidate motion plan selection module 112 obtains, from the library of motion plans 122, a pre-generated candidate motion plan 125 for performing a specific task. The candidate motion plan selection module 112 selects the candidate motion plan that best matches the present observations of the robot in the workcell. The candidate motion plan adaptation module 114 adapts the selected candidate motion plan according to the present observations of the robot in the workcell to generate a final motion plan to be executed by the robot.

This process is described in more detail below with reference to FIG. 2.

Figure 2:
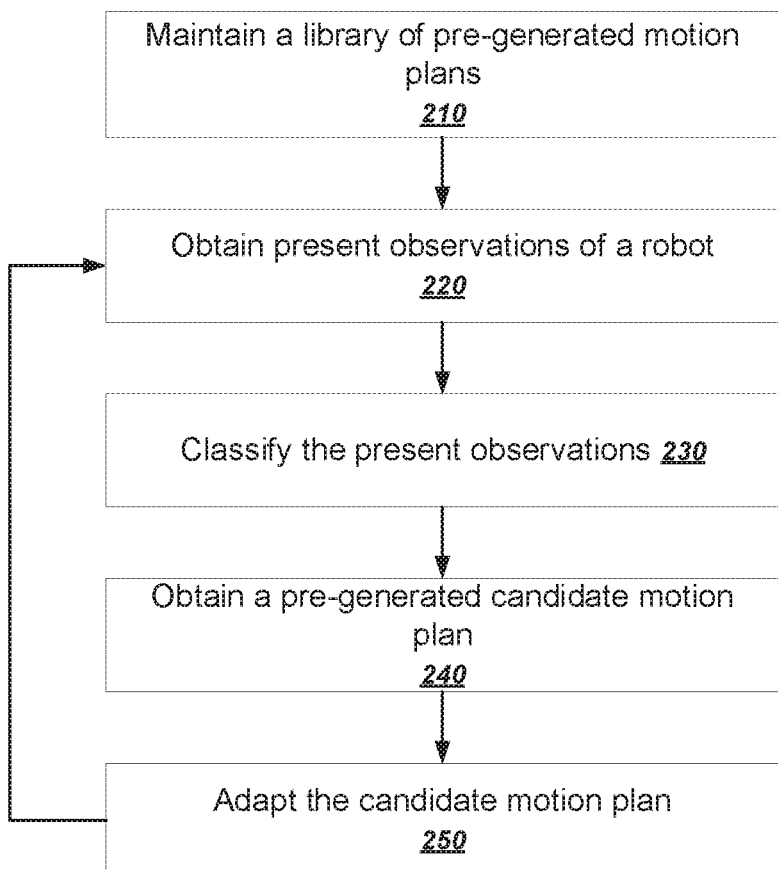
FIG. 2 is a flowchart of an example process for generating a final plan to be executed by a robot.

FIG. 2 is a flowchart of an example process for generating a final plan to be executed by a robot. The process can be implemented by one or more computer programs installed on one or more computers in one or more locations and programmed in accordance with this specification. For example, the process can be performed by the online execution system 110 shown in FIG. 1. For convenience, the process will be described as being performed by a system of one or more computers.

The system maintains a library of candidate motion plans (210). The library of motion plans 122 stores candidate motion plans for performing one or more particular tasks. A task can be defined in relation to objects or obstacles in the workcell (e.g., moving an object while avoiding an obstacle). A task can also be defined in relation to goal points or goal paths in the workcell. A goal point is a physical location that the robot must reach. A goal path is a physical path that the robot must take.

The candidate motion plans are generated by the offline planner 120 prior to execution. For a given task, the offline planner 120 computes a plurality of candidate motion plans for performing the task under different nominal conditions. Nominal conditions can include the location of objects or obstacles, as well as goal points or goal paths, that define the task. A task can also be defined in relation to goal points or goal paths in the workcell. Each candidate motion plan is computed for a specific set of nominal conditions. Nominal conditions are possible conditions that could be observed by the robot in the workcell. A finite number of candidate motion plans cover every possible combination of conditions in the workcell. Each set of nominal conditions is defined by a set of nominal values that correspond to possible values of observable variables that could be measured by the robot in the workcell. In particular, each set of nominal conditions can include nominal values that corresponds to status messages 135 that could be generated by the robot 173 as well as online observations 145 that could be made by the one or more sensors 171*a-n* making observations within the workcell 170.

Possible values of quantitative observable variables, such as continuous variables (e.g., a distance from an object, an angular orientation of an object) can be grouped within given intervals. A label is assigned to each interval. The label can be a discrete value of the variable. For each interval, one value within the interval is selected as a nominal value for the interval.

For example, a distance between the robot and an object in the workcell can be classified in intervals, a label indicating a degree of distance between the robot and the object in the workcell being assigned to each of the intervals. For example, the distance can be classified in three intervals labeled "very close", "close", and "far". For example, the label "very close" is associated with a distance of less than 1 m and to a nominal value of 0.5 m; the label "close" is associated with an interval of 1 m to 5 m and to a nominal value of 2 m; the label "far" is associated with a distance of more than 10 m and to a nominal value of 20 m.

For qualitative observable variables (e.g., whether a state of the workcell is known or unknown, a quality of perception, an orientation of an object), each possible value of the qualitative observable variable can be used as a label of the variable. Each label of the variable is selected as a nominal value of the variable. Possible values of qualitative observable variables can also be summarized as counts or cross tabulations, for example in the form of a contingency table. A label is associated with each possible value of the count or of a sub-total of the cross tabulation.

For example, a quality of perception of the robot in the workcell can be associated with two labels: "good enough", and "not good enough". As another example, a quality of estimation of the pose of an object can be associated with two labels: "good enough", and "not good enough". As another example, an orientation of an object can be associated with two labels: "flipped", and "not flipped". As still another example, whether it is known where an object is can be associated with two labels: "yes", and "no".

For a given observable variable of the robot in the workcell, the resulting nominal values include a finite number of discrete values. Each nominal value is associated with a label. Each candidate motion plan is generated for a specific set of nominal values and associated with the corresponding set of labels.

Each candidate motion plan comprises a sequence of configuration waypoints that the robot 173 can take to accomplish the task under the associated nominal conditions. A configuration waypoint is defined by a configuration that describes the pose of the robot. A configuration can be describes using a number of parameters. For a robot having N degrees of freedom, the number of parameter is typically N. Each parameter can be an absolute location (e.g., a longitudinal and latitudinal coordinate or a GPS point), or a relative location (e.g., relatively to a mapped point or an object in the workcell). A candidate motion plan can specify a trajectory for a transition between two successive configuration waypoints. A candidate motion plan can also specify a start time for a transition, an end time for a transition, or both. A configuration waypoint can also define one or more actions to be performed when the robot is at the configuration waypoint. For example, an action can be to move a robot arm, apply a weld, open a gripper, close a gripper, or any other appropriate action that can be performed by a robot. The action can also be a composite action that includes multiple other actions. For example, if the task is to grasp an object, each candidate motion plan can define a different type of grasp. Each different type of grasp is adapted for a specific pose of the object.

The system obtains present observations of the robot (220). The present observations can include status messages 135 generated by the robot 173 and online observations 145 made by one or more sensors 171$a$-$n$ making observations within the workcell 170. The robot 173 and the one or more sensors 171$a$-$n$ acquire all the data necessary to classify each of the observations used for generating the candidate motion plans.

The system classifies the present observations (230). To that end, the system assigns labels to the present observations. For each observation, the system assigns one of a predetermined number of possible labels associated with the observable variable to the observation. For each observable variable, the possible labels are the ones defined for that observable variable during the generation of the candidate motion plans. In particular, observations of continuous observable variables (e.g., a distance from an object, an angular orientation of an object) are classified into discrete values. The resulting classified observations are categorical variables that can take on one of a limited number of possible values. Each of the possible values of the classified observations corresponds to a label defined for that observable variable during the generation of the candidate motion plans.

For each of the present observation, the system assigns, to the present observation, one of the labels defined for that observable variable during the generation of the candidate motion plans. For observations of quantitative observable variables (e.g., a distance from an object, an angular orientation of an object), continuous as well as discrete, each observation can be assigned the label associated with the interval in which the observation is included. For observations of qualitative variables (e.g., whether a state of the workcell is known or unknown, a quality of perception, an orientation of an object), the observation can be directly assigned the corresponding label of the variable. Observations of qualitative variables can also be summarized as counts or cross tabulations, for example in the form of a contingency table. The observations are then assigned one or more labels corresponding to the count or the sub-total of the cross tabulation.

The system obtains a pre-generated candidate motion plan (240). The pre-generated candidate motion plan is selected from the library of candidate motion plans 122. The system selects the available candidate motion plan that best matches the present observations of the robot in the workcell. To that end, the system selects the candidate motion plan associated with the set of labels corresponding to the labels assigned to the present observations.

Figure 3:
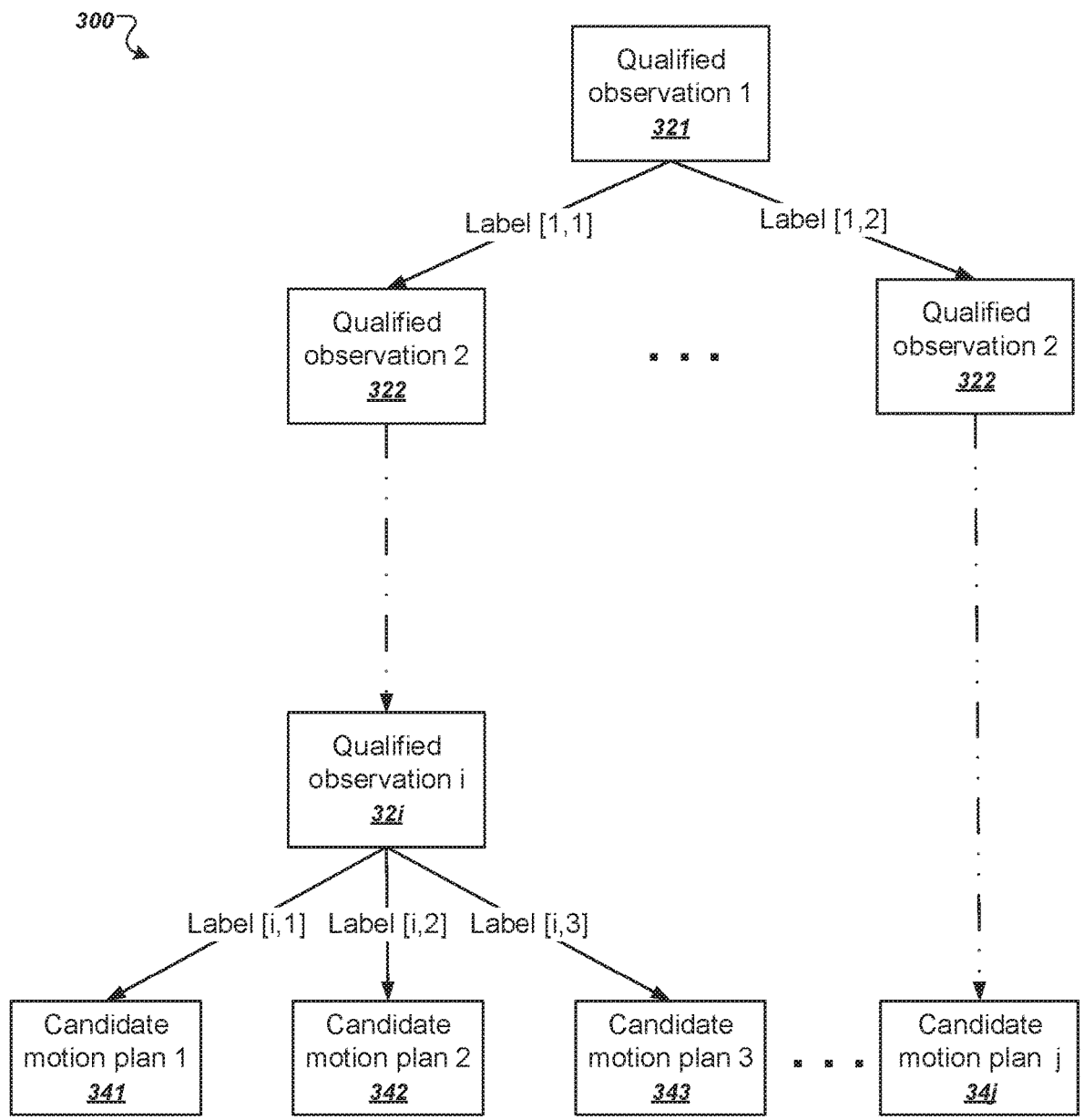
FIG. 3 is a flowchart of an example decision tree for selecting a candidate motion plan.

FIG. 3 is an example decision tree 300 for selecting the pre-generated candidate motion plan. The decision tree includes decision nodes 321-32$i$. The input variables are the labels assigned to the present observations of the robot in the workcell. Each decision node 321-32$i$ corresponds to an observable variable of the robot in the workcell. For each decision node 321-32$i$, there are edges to children for each of the labels associated with that observable variable. Each leaf node 341-34$j$ represents the candidate motion plan that is selected by the system given the labels represented by the path from the root to the leaf.

For example, if the quality of perception of the robot in the workcell has been classified as "good enough," the quality of estimation of the pose of an object has been classified as "good enough," the orientation of the object has been classified as "flipped," the system selects the candidate motion plan corresponding to a specific type of grasp.

As shown in FIG. 2, the system adapts the candidate motion plan (250). The selected candidate motion plan might not be exactly adapted for the actual present conditions in the workcell. Therefore, the system adapts the selected candidate motion plan based on the present observations made by the robot in the workcell. In particular, configuration waypoints of the candidate motion plan can be adjusted to more closely align with the present observations in the workcell. For example, the actual location of objects or obstacles in the workcell, or the actual location of goal points or goal paths may differ from the location of obstacles, goal points or goal paths that were used to calculate the selected nominal motion plan. In that case, configuration waypoints of the candidate motion plan are adjusted to better solve the task that is defined by the actual location of the objects or obstacles in the workcell, or the actual location of the goal points or goal paths in the workcell.

Figure 4:
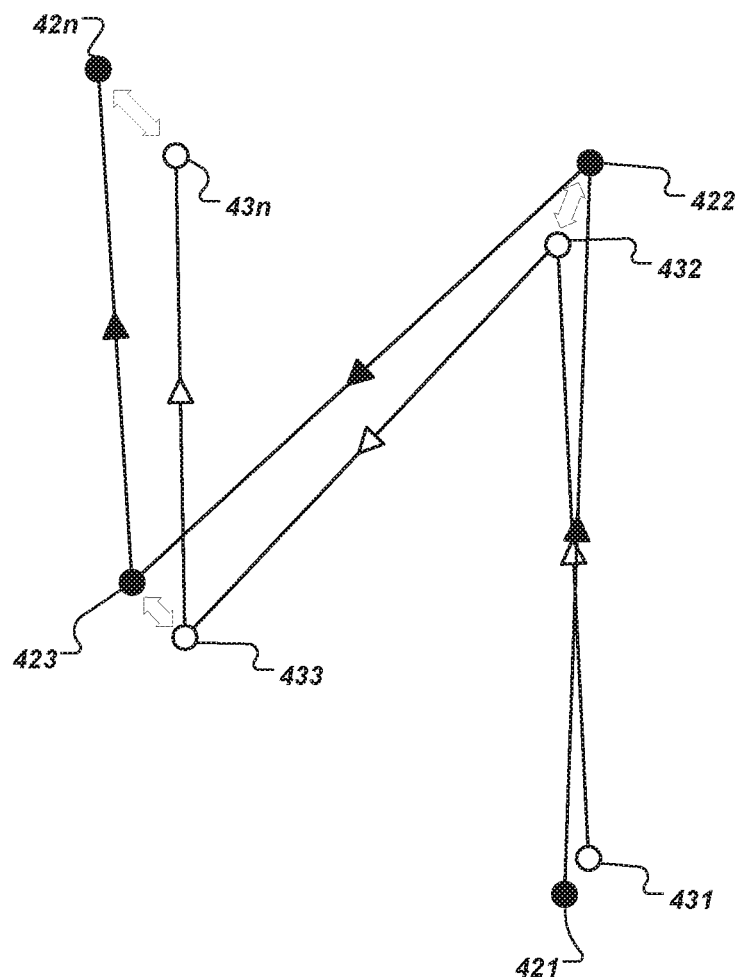
FIGS. 4-5 are visual illustrations of example motion plans illustrating the adaptation of a candidate motion plan.
Figure 4:
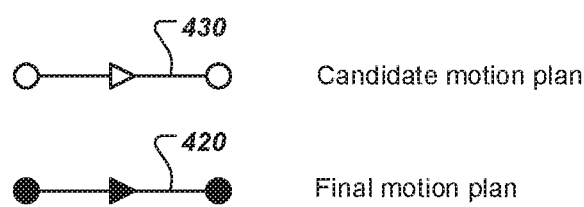
Figure 5:
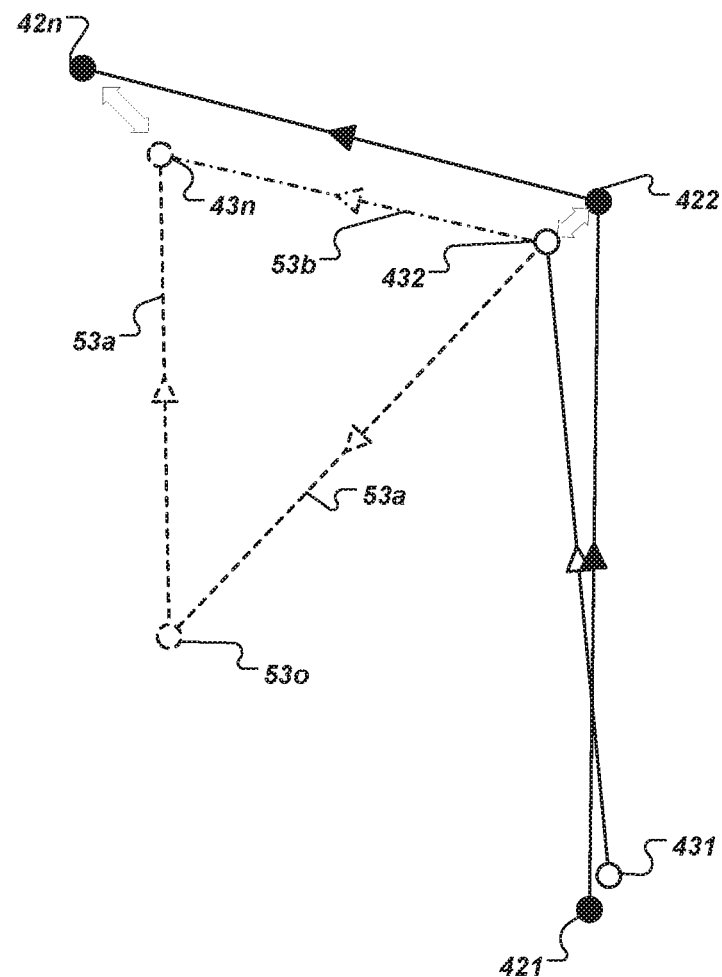

FIGS. 4-5 illustrate adapting the selected candidate motion plan. For clarity, in the illustrated examples of FIGS. 4-5, the configuration space is a plane. The robot can however evolve in a higher-dimensional configuration space. For example, if the movement of the robot has N degrees of freedom, the configuration space is N-dimensional.

The candidate motion plan 430 is defined by a series of configuration waypoints 431-43$n$, comprising a start configuration 431, and a goal configuration 43$n$. The configuration waypoints 431-43$n$ define a path that the robot can take to perform the task. In the illustrated example of FIG. 4, the transition between two successive configuration waypoints 431-43$n$ is a straight line. The candidate motion plan can however define any other type of trajectory for the transition between two configuration waypoints, for instance, a spline (e.g., function defined piecewise by polynomials). One or more parameters of one or more of the configuration waypoints 431-43$n$ are modified to match the actual position of one or more objects in the workcell. Waypoints that depend on sensor observations, as well as other waypoints, may be adapted. To resolve collisions of modified parts of the path, motion plan adaption can run online motion planning to sample alternative collision-free waypoints to find a collision-free path. To minimize the duration and improve the smoothness of the modified path, motion optimization can be used to adjust waypoint positions. This can be implemented by computing the derivative of the duration of the path with respect to changing waypoints, and iteratively modify waypoints in a direction that reduces the duration of the path. The resulting configuration waypoints 421-42n define the final motion plan 420. Once the final motion plan 420 is generated, the system issues commands to the robot interface system in order to actually drive the movements of the moveable components of the robot according to the final motion plan 420.

As shown in FIG. 5, the candidate motion plan 430 can be partially defined. The candidate motion plan 430 specifies alternative paths 53a, 53b. The candidate motion plan 430 can also specify one or more optional configuration waypoints 53o, as well as optional actions.

For example, if the task includes grasping an object, the candidate motion plan 430 can specify two alternative paths 53a, 53b. The first path 53a is selected when the object is flipped. The second path 53b is selected when the object is not flipped. The first path 53a includes an additional configuration waypoint 53o associated with flipping back the object.

Figure 6:
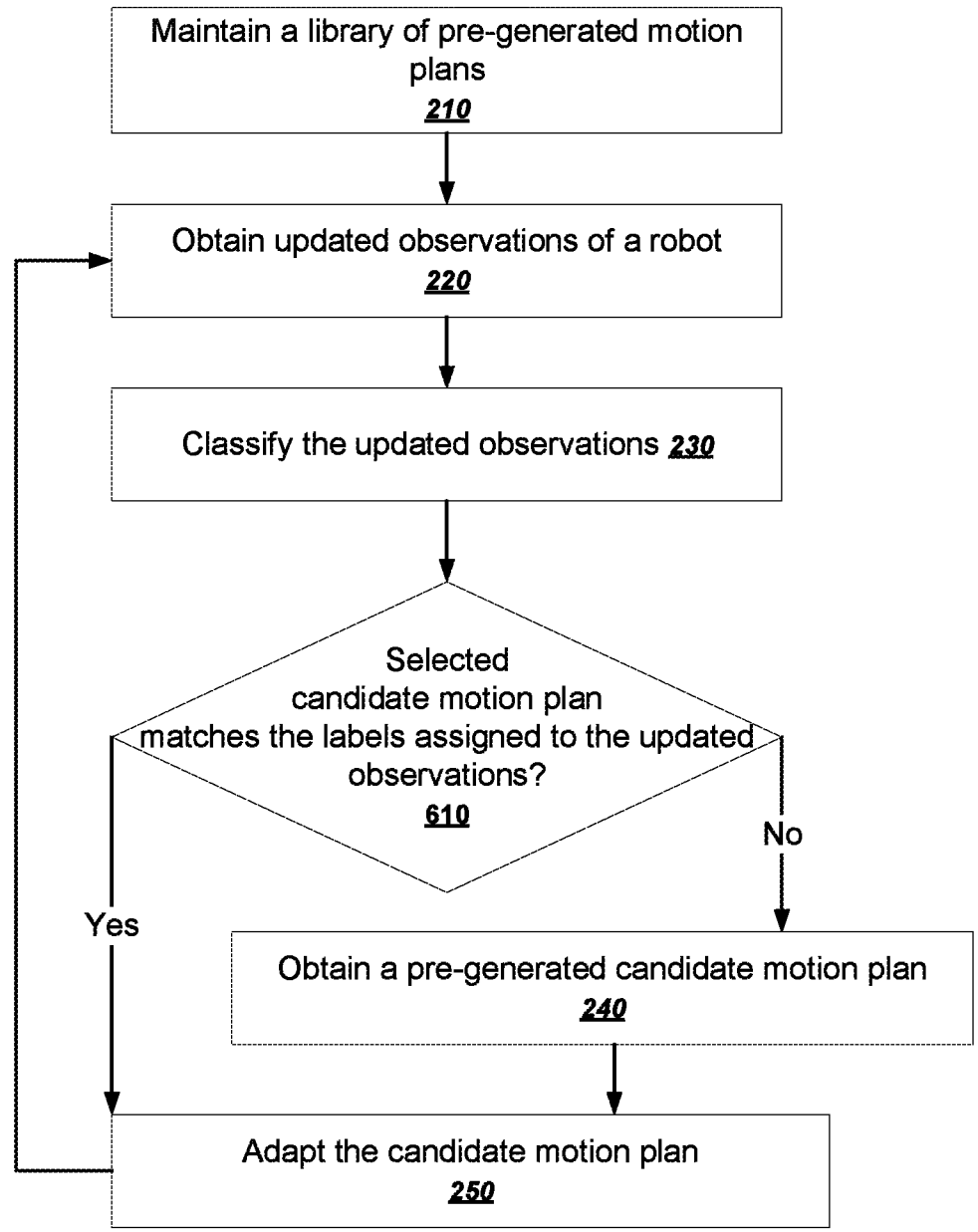
FIG. 6 is a flowchart of another example process for generating a final plan to be executed by a robot.

As shown in FIG. 6, the final motion plan can be continuously updated during execution. After the final motion plan has been generated (250), the system obtains updated observations of the robot (220). The system classifies the updated observations (230). The system determines whether the selected candidate motion plan matches the labels assigned to the updated observations (610). In particular, the selected candidate motion plan is considered to match the updated observations when the set of labels associated with the selected candidate motion plan is identical to the set of labels assigned to the updated observations. If the updated observations match the selected candidate motion plan, the system adapts the selected candidate motion plan to the updated observations (250). If the updated observations do not match the selected candidate motion plan, the system selects another candidate motion plan from the library of motion plans (240), and adapts the newly selected candidate motion plan to the updated observations (250).

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

In this specification, a task is an operation to be performed by a tool. For brevity, when a robot has only one tool, a task can be described as an operation to be performed by the robot as a whole. Example tasks include welding, glue dispensing, part positioning, and surfacing sanding, to name just a few examples. Tasks are generally associated with a type that indicates the tool required to perform the task, as well as a position within a workcell at which the task will be performed.

In this specification, a motion plan is a data structure that provides information for executing a task, or a cluster of tasks. A motion plan defines a sequence of configurations that the robot can take to accomplish the task. Motion plans can be fully constrained, meaning that all values for all controllable degrees of freedom for the robot are represented explicitly or implicitly; or underconstrained, meaning that some values for controllable degrees of freedom are unspecified. In some implementations, in order to actually perform a task corresponding to a motion plan, the motion plan must be fully constrained to include all necessary values for all controllable degrees of freedom for the robot. Thus, at some points in the planning processes described in this specification, some motion plans may be underconstrained, but by the time the motion plan is actually executed on a robot, the motion plan can be fully constrained.

In this specification, a transition is a motion plan that describes a movement to be performed between a start point and an end point. The start point and end point can be represented by poses, locations in a coordinate system, or tasks to be performed. Transitions can be underconstrained by lacking one or more values of one or more respective controllable degrees of freedom (DOF) for a robot. Some transitions represent free motions. In this specification, a free motion is a transition in which none of the degrees of freedom are constrained. For example, a robot motion that simply moves from pose A to pose B without any restriction on how to move between these two poses is a free motion. During the planning process, the DOF variables for a free motion are eventually assigned values, and path planners can use any appropriate values for the motion that do not conflict with the physical constraints of the workcell.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the online execution system 110 and the robot interface subsystem 160 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g., a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
maintaining a library of pre-generated motion plans for performing a particular task, wherein each pre-generated motion plan comprises a plurality of waypoints and one or more actions;
obtaining one or more present observations of a robot in a workcell;
classifying the one or more observations, wherein one or more of a predetermined number of possible labels are assigned to the one or more observations;
obtaining a pre-generated candidate motion plan that matches the one or more labels assigned to the one or more present observations of the robot in the workcell, the pre-generated candidate motion plan being selected from the library of pre-generated motion plans; and
adapting the pre-generated candidate motion plan according to the one or more present observations of the robot in the workcell to generate a final motion plan to be executed by the robot.

Embodiment 2 is the method of embodiment 1, wherein adapting the pre-generated candidate motion plan comprises adjusting waypoints in the pre-generated candidate motion plan to more closely align with the one or more observations in the workcell.

Embodiment 3 is the method of any one of embodiments 1-2, wherein the possible labels that can be assigned to one of the present observations comprise discrete values of an observable variable corresponding to the present observation.

Embodiment 4 is the method of any one of embodiments 1-3, wherein the labels represent a degree of distance between the robot and an object in the workcell.

Embodiment 5 is the method of any one of embodiments 1-4, wherein the labels represent whether a state of the workcell is known or unknown.

Embodiment 6 is the method of any one of embodiments 1-5, wherein the labels represent an orientation of an object in the workcell.

Embodiment 7 is the method of any one of embodiments 1-6, wherein obtaining the pre-generated candidate motion plan that matches the labels assigned to the present observations comprises determining the pre-generated motion plan within the library of pre-generated motion plans that is associated with a set of labels corresponding to the labels assigned to the present observations.

Embodiment 8 is the method of any one of embodiments 1-7, wherein the pre-generated candidate motion plan is selected using a decision tree.

Embodiment 9 is the method of any one of embodiments 1-8, further comprising executing, by the robot, the final plan to perform the task.

Embodiment 10 is the method of any one of embodiments 1-9, further comprising:
obtaining one or more updated observations of a robot in a workcell;
classifying the one or more updated observations, wherein one or more of the possible labels are assigned to the one or more updated observations;
determining whether the selected candidate motion plan matches the one or more labels assigned to the updated observations;
if the selected candidate motion plan matches the updated observations, adapting the pre-generated candidate motion plan according to the one or more updated observations of the robot in the workcell to generate an updated final motion plan to be executed by the robot; and
if the selected candidate motion plan does not match the updated observations, selecting another candidate motion plan from the library of pre-generated motion plans, and adapting the selected candidate motion plan according to the one or more updated observations of the robot in the workcell to generate an updated final motion plan to be executed by the robot.

Embodiment 11 is a system comprising: one or more computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    maintaining a library of pre-generated motion plans for performing a particular task in a workcell, wherein each pre-generated motion plan is associated with a different discrete label that represents a continuous interval in the workcell, wherein each pre-generated motion plan comprises a plurality of waypoints that collectively define a path to be taken by a robot to perform the particular task and one or more actions to be performed by the robot when the robot is at each of one or more of the plurality of waypoints;
    obtaining one or more present observations of a robot in the workcell, each present observation having a respective observation value;
    classifying one or more of the observation values, including assigning a first discrete label of a predetermined number of possible discrete labels to a continuous observation value in the observation values, each possible discrete label representing a respective interval within a possible range for the continuous observation value;
    selecting, from the library of pre-generated motion plans associated with the different discrete labels, a pre-generated candidate motion plan associated with the first discrete label;
    adapting waypoints of the selected pre-generated candidate motion plan according to the one or more present observations of the robot in the workcell to generate a final motion plan to be executed by the robot;
    obtaining one or more updated observations of a robot in a workcell, each updated observation having a respective updated observation value;
    classifying one or more of the updated observation values, including assigning a second discrete label of the predetermined number of possible discrete labels to a continuous observation value in the updated observation values;
    determining whether the selected pre-generated candidate motion plan matches the second discrete label assigned to the continuous observation value in the updated observation values;
    if the selected pre-generated candidate motion plan matches the second discrete label assigned to the continuous observation value in the updated observation values, adapting the selected pre-generated candidate motion plan according to the one or more updated observations of the robot in the workcell to generate an updated final motion plan to be executed by the robot, and
    if the selected pre-generated candidate motion plan does not match the second discrete label assigned to the continuous observation value in the updated observation values, selecting another pre-generated candidate motion plan from the library of pre-generated motion plans, and adapting the other pre-generated candidate motion plan according to the one or more updated observations of the robot in the workcell to generate an updated final motion plan to be executed by the robot.

2. The method of claim 1, wherein adapting the waypoints of the selected pre-generated candidate motion plan comprises adjusting the waypoints in the selected pre-generated candidate motion plan to more closely align with the one or more observations in the workcell.

3. The method of claim 1, wherein the continuous observation values comprise a distance between the robot to an object in the workcell, and wherein the labels represent a degree of the distance between the robot and the object in the workcell.

4. The method of claim 1, wherein the discrete labels represent whether a state of the workcell is known or unknown.

5. The method of claim 1, wherein the discrete labels represent an orientation of an object in the workcell.

6. The method of claim 1, wherein the pre-generated candidate motion plan is selected using a decision tree having nodes that correspond to observable variables of the robot in the workcell and edges that correspond to the possible discrete labels.

7. The method of claim 1, further comprising executing, by the robot, the final plan to perform the task.

8. A system comprising:
    one or more computers and one or more storage devices storing instructions that are operable, when executed by the one or more computers, to cause the one or more computers to perform operations comprising:
        maintaining a library of pre-generated motion plans for performing a particular task in a workcell, wherein each pre-generated motion plan is associated with a different discrete label that represents a continuous interval in the workcell, wherein each pre-generated motion plan comprises a plurality of waypoints that collectively define a path to be taken by a robot to perform the particular task and one or more actions to be performed by the robot when the robot is at each of one or more of the plurality of waypoints;
        obtaining one or more present observations of a robot in the workcell, each present observation having a respective observation value;
        classifying one or more of the observation values, including assigning a first discrete label of a predetermined number of possible discrete labels to a continuous observation value in the observation values, each possible discrete label representing a respective interval within a possible range for the continuous observation value;
        selecting, from the library of pre-generated motion plans associated with the different discrete labels, a pre-generated candidate motion plan associated with the first discrete label;
        adapting waypoints of the selected pre-generated candidate motion plan according to the one or more present observations of the robot in the workcell to generate a final motion plan to be executed by the robot;

obtaining one or more updated observations of a robot in a workcell, each updated observation having a respective updated observation value;

classifying one or more of the updated observation values, including assigning a second discrete label of the predetermined number of possible discrete labels to a continuous observation value in the updated observation values;

determining whether the selected pre-generated candidate motion plan matches the second discrete label assigned to the continuous observation value in the updated observation values;

if the selected pre-generated candidate motion plan matches the second discrete label assigned to the continuous observation value in the updated observation values, adapting the selected pre-generated candidate motion plan according to the one or more updated observations of the robot in the workcell to generate an updated final motion plan to be executed by the robot, and if the selected pre-generated candidate motion plan does not match the second discrete label assigned to the continuous observation value in the updated observation values, selecting another pre-generated candidate motion plan from the library of pre-generated motion plans, and adapting the other pre-generated candidate motion plan according to the one or more updated observations of the robot in the workcell to generate an updated final motion plan to be executed by the robot.

9. The system of claim 8, wherein adapting the waypoints of the selected pre-generated candidate motion plan comprises adjusting the waypoints in the selected pre-generated candidate motion plan to more closely align with the one or more observations in the workcell.

10. The system of claim 8, wherein the continuous observation values comprise a distance between the robot to an object in the workcell, and wherein the labels represent the degree of distance between the robot and the object in the workcell.

11. The system of claim 8, wherein the discrete labels represent whether a state of the workcell is known or unknown.

12. The system of claim 8, wherein the discrete labels represent an orientation of an object in the workcell.

13. The system of claim 8, wherein the operations further comprise executing, by the robot, the final plan to perform the task.

14. One or more non-transitory computer storage media encoded with computer program instructions that when executed by one or more computers cause the one or more computers to perform operations comprising:

maintaining a library of pre-generated motion plans for performing a particular task in a workcell, wherein each pre-generated motion plan is associated with a different discrete label that represents a continuous interval in the workcell, wherein each pre-generated motion plan comprises a plurality of waypoints that collectively define a path to be taken by a robot to perform the particular task and one or more actions to be performed by the robot when the robot is at each of one or more of the plurality of waypoints;

obtaining one or more present observations of a robot in the workcell, each present observation having a respective observation value;

classifying one or more of the observation values, including assigning a first discrete label of a predetermined number of possible discrete labels to a continuous observation value in the observation values, each possible discrete label representing a respective interval within a possible range for the continuous observation value;

selecting, from the library of pre-generated motion plans associated with the different discrete labels, a pre-generated candidate motion plan associated with the first discrete label;

adapting waypoints of the selected pre-generated candidate motion plan according to the one or more present observations of the robot in the workcell to generate a final motion plan to be executed by the robot;

obtaining one or more updated observations of a robot in a workcell, each updated observation having a respective updated observation value;

classifying one or more of the updated observation values, including assigning a second discrete label of the predetermined number of possible discrete labels to a continuous observation value in the updated observation values;

determining whether the selected pre-generated candidate motion plan matches the second discrete label assigned to the continuous observation value in the updated observation values;

if the selected pre-generated candidate motion plan matches the second discrete label assigned to the continuous observation value in the updated observation values, adapting the selected pre-generated candidate motion plan according to the one or more updated observations of the robot in the workcell to generate an updated final motion plan to be executed by the robot, and if the selected pre-generated candidate motion plan does not match the second discrete label assigned to the continuous observation value in the updated observation values, selecting another pre-generated candidate motion plan from the library of pre-generated motion plans, and adapting the other pre-generated candidate motion plan according to the one or more updated observations of the robot in the workcell to generate an updated final motion plan to be executed by the robot.

15. The method of claim 1, wherein assigning the first discrete label of the predetermined number of possible discrete labels to the continuous observation value in the observation values comprises:

assigning a same first discrete label to two or more different continuous observation values in the observation values.

16. The method of claim 1, wherein each discrete label is associated with a nominal value selected from within the continuous interval represented by the discrete label.

17. The method of claim 1, wherein maintaining the library of pre-generated motion plans comprises maintaining a finite number of pre-generated motion plans for multiple combinations of the continuous intervals in the workcell.

* * * * *